United States Patent [19]

Blackwell

[11] 4,237,039
[45] Dec. 2, 1980

[54] SALTS OF ARYLALKANOIC ACIDS AS CORROSION INHIBITORS FOR POLY(ARYLENE SULFIDE)S

[75] Inventor: Jennings P. Blackwell, Bartlesville, Okla.

[73] Assignee: Phillips Petroleum Company, Bartlesville, Okla.

[21] Appl. No.: 970,684

[22] Filed: Dec. 18, 1978

[51] Int. Cl.$^3$ .............................................. C08L 81/04
[52] U.S. Cl. ................................. 260/29.2 R; 252/395; 252/396; 428/419; 525/5; 525/537
[58] Field of Search ............................. 252/396, 395; 106/14.13, 14.43; 260/29.2 R; 525/5, 537

[56] References Cited

U.S. PATENT DOCUMENTS

| | | | |
|---|---|---|---|
| 2,629,649 | 2/1953 | Wachter et al. | 21/2.5 |
| 3,354,129 | 11/1967 | Edmonds et al. | 528/381 |
| 3,449,262 | 6/1969 | Archer et al. | 252/396 |
| 3,622,376 | 11/1971 | Tieszen et al. | 260/37 |
| 3,634,125 | 1/1972 | Tieszen | 428/457 |
| 3,701,665 | 10/1972 | Grimes et al. | 99/1 |
| 3,717,620 | 2/1973 | Rohlfing | 260/9 R |
| 3,919,177 | 11/1975 | Campbell | 528/381 |
| 4,017,450 | 4/1977 | Bailey | 260/37 R |
| 4,064,084 | 12/1977 | Blackwell | 260/29.2 R |

OTHER PUBLICATIONS

Chem. Abstract, "Salts of Certain Aromatic Acids as Corrosion Inhibitors of Metals in Neutral Media", Balezin et al., vol. 59, (1963), p. 12459d.

*Primary Examiner*—Wilbert J. Briggs, Sr.

[57] ABSTRACT

Poly(arylene sulfide) coating compositions are described comprising a mixture of a poly(arylene sulfide) and a salt of an arylalkanoic acid in an aqueous medium.

14 Claims, No Drawings

SALTS OF ARYLALKANOIC ACIDS AS CORROSION INHIBITORS FOR POLY(ARYLENE SULFIDE)S

BACKGROUND OF THE INVENTION

1. Field of the Invention

This invention is directed to poly(arylene sulfide) coating compositions, to articles coated with these compositions, and to methods of applying the compositions to a substrate.

2. Description of the Prior Art

Poly(arylene sulfide)s are well known for their high-temperature stability. The polymers are used to coat substrates by methods such as applying an aqueous slurry of the polymer to the substrate, removing the aqueous dispersion medium, and heating the coated substrate to cure the polymer. A problem encountered in this process is the formation of corrosion or rust on the surface of the substrate to be coated when the substrate is exposed to moisture and air during the coating process. The presence of rust can prevent the formation of a continuous, uniform cured coating which has no exposed substrate material. The applicant has found that uniform, smooth, non-pitted laminates can be prepared from poly(arylene sulfide) coating compositions which contain a corrosion-inhibiting agent.

SUMMARY OF THE INVENTION

It is thus an object of this invention to provide poly(arylene sulfide) coating compositions which, upon application and curing on a metal substrate such as an iron or iron-containing substrate, give a smooth, corrosion-free surface.

This object is achieved by including in an aqueous slurry of an arylene sulfide polymer an ammonium or alkali metal salt of an arylalkanoic acid. The use of the invention permits the coating of metal substrates, for example iron or iron-containing substrates, by applying such an aqueous slurry to the substrate, removing the aqueous medium, and then curing the polymer. The result is a cured arylene sulfide polymer coating which is smooth and essentially free of corrosion or rust products.

DESCRIPTION OF THE PREFERRED EMBODIMENTS

Among ammonium or alkali metal salts of arylalkanoic acids for use in the invention are those which can be represented by the formula $RCO_2M$, where R is an unsubstituted or alkyl-substituted aralkyl radical having about 7 to about 20 carbon atoms and M is ammonium, lithium, sodium, potassium, rubidium, or cesium. Examples of some ammonium or alkali metal salts of arylalkanoic acids which can be used are ammonium phenylacetate, sodium phenylacetate, sodium p-tolylacetate, ammonium 3-phenylpropionate, potassium 3-(2-ethylphenyl)propionate, rubidium 4-(3-isopropylphenyl)butyrate, cesium 3-methyl-4-(4-butylphenyl)butyrate, ammonium 6-(2-methyl-5-hexylphenyl)hexanoate, sodium 4-tridecylphenylacetate, potassium 15-phenylpentadecanoate, rubidium 2-naphthylacetate, cesium 2-methyl-4-(4-methyl-1-naphthyl)butyrate, and mixtures of these. If desired, the ammonium or alkali metal salt can be produced from the corresponding arylalkanoic acid and ammonium or alkali metal hydroxide in the aqueous medium or aqueous slurry.

The nature of the arylene sulfide polymers for use in this invention is not critical provided the polymer is fusible. The polymer is preferably a solid at 25° C. The polymer can be linear, branched, or lightly crosslinked. Suitable arylene sulfide polymers can be produced, for example, by the methods of Edmonds et al. U.S. Pat. No. 3,354,129 and Campbell U.S. Pat. No. 3,919,177. If desired, such polymers can be subjected to mild, partial curing or light crosslinking, as in the method of Rohlfing U.S. Pat. No. 3,717,620, prior to being used in the coating compositions of this invention. The arylene sulfide polymers presently preferred are linear, branched, or lightly crosslinked poly(phenylene sulfide)s.

The aqueous medium in which the components of the slurry are dispersed or dissolved can be water or a solution of water and a water-miscible solvent such as ethylene glycol, propylene glycol, glycerol, methyl alcohol, ethyl alcohol, and isopropyl alcohol. Although the weight ratio of water to water-miscible solvent, when used, is not critical, for reasons of economy this ratio will generally be at least about 0.3:1, and it will usually be at least 1:1.

The concentration of arylene sulfide polymer in the aqueous slurry can vary over a wide range. Generally, the arylene sulfide polymer will be in the range of about 10 to 60, preferably 20 to 40, weight percent of the total slurry. The concentration of the ammonium or alkali metal salt of an arylalkanoic acid can vary over a wide range, but generally this salt will be in the range of about 0.05 to 10, preferably 0.2 to 3, weight percent of the total slurry.

In some instances it is desirable to include in the coating composition components in addition to the arylene sulfide polymer and the ammonium or alkali metal salt of an arylalkanoic acid. Such components include, for example, other polymers such as poly(tetrafluoroethylene), surface active agents, and pigments and fillers such as titanium dioxide, ferric oxide, cobaltic oxide, zinc oxide, molybdenum disulfide, graphite, carbon black, calcium carbonate, and silica.

The invention is particularly useful for coating substrates made of iron and steel. The iron content of an iron or iron-containing substrate used in the practice of the invention is not critical. However, the advantages to be derived from the invention will be greatest when the iron content of the substrate is at least 20 weight percent. The substrate can be in any form desired, including sheeting, wire, coupons, blanks, and objects which have been molded, carved, or otherwise formed into specific shapes.

After application of the slurry to the substrate and removal of the aqueous medium, usually by evaporation with heating, the coating can be cured by heating at a temperature within the range of about 260° C. to 480° C. preferably about 320° C. to 420° C. for about 5 minutes to 24 hours, preferably about 8 minutes to 4 hours, in an oxygen-containing atmosphere such as air. If desired, the cured coating can be annealed by, for example, heating at a temperature within the range of about 110° C. to 270° C. for about 20 minutes to 12 hours. The final coating generally will have a thickness of at least 1 mil and can be as thick as 20 mils or more.

In the following examples, ammonium phenylacetate was used as a corrosion inhibitor in a poly(p-phenylene sulfide) coating composition. The polymer was prepared from p-dichlorobenzene, sodium sulfide, and N-methyl-2-pyrrolidone according to the method of Edmonds et al. U.S. Pat. No. 3,354,129. The polymer had a melt flow of 6150 g/10 min (determined by the method of ASTM D 1238-70, modified to a temperature of 316° C. using a 5-kg weight) and an inherent viscosity of 0.14 (determined at 206° C. in 1-chloronaphthalene at a polymer concentration of 0.4 g/100 ml solution).

EXAMPLE I

In this run, 2 g phenylacetic acid was mixed with 98 ml water and the resulting mixture was warmed slightly to dissolve the acid. A few ml of concentrated ammonium hydroxide was added to give a solution with a pH of 8, thereby producing ammonium phenylacetate. 1.5 g Triton X-100 surface-active agent, which is a condensation product of t-octylphenol and ethylene oxide having an average of 9 to 10 ethylene-oxy units per molecule, was mixed with the solution. A slurry was then prepared by mixing 16 g of the above solution, 6 g poly(p-phenylene sulfide), and 2 g titanium dioxide. When the resulting slurry was spread on a clean, grit-blasted iron coupon and the coupon placed in a humid environment for 3 hours, there was no evidence of rust formation.

As a control, 98 ml water was treated with a few drops of concentrated ammonium hydroxide to provide a solution having a pH within the range of 8 to 9, after which 1.5 g Triton X-100 surface active agent was mixed with the solution. A slurry was then prepared by mixing 16 g of the above solution, 6 g poly(p-phenylene sulfide), and 2 g titanium dioxide. A clean grit-blasted coupon coated with this slurry and placed in a humid environment was covered with rust within 15 minutes.

EXAMPLE II

A composition prepared by mixing 48 g poly(p-phenylene sulfide), 16 g titanium dioxide, 153 g water, 2.5 g Triton X-100 surface active agent, 2 g phenylacetic acid, and 1.6 g concentrated ammonium hydroxide was ball-milled to give a slurry containing ammonium phenylacetate and having a pH of 8. The slurry was spread on a clean, grit-blasted carbon steel coupon, and the coupon was placed in a high-humidity environment. After three hours, the coupon showed no evidence of rust formation.

EXAMPLE III

A run was carried out in which a clean, grit-blasted iron coupon was spray-coated with the ball-milled coating composition of Example II and the coating was cured by heating the coated coupon at 371° C. for 30 minutes. The cured coating was then annealed by heating the coated coupon at 232° C. for 2 hours. Examination of the coating under 20× magnification revealed a few dark particles which did not appear to be rust. The coating was smooth and even. When the coated coupon was bent to a 90° angle over a 3/16-inch mandrel, no cracks were detected.

EXAMPLE IV

A clean, grit-blasted iron coupon was spray-coated with the ball-milled coating composition described in Example II, and the coating was cured by heating the coated coupon at 371° C. for 30 minutes. Examination of the cured coating revealed it to be smooth and even, with few craters or pinholes. No rust or dark spots were observed. Adhesion was good.

A control run was performed in which a clean, grit-blasted iron coupon was spray-coated with a ball-milled coating composition comparable to that used above except that no phenylacetic acid or concentrated ammonium hydroxide was added. The coating was cured by heating the coated coupon at 371° C. for 30 minutes. Examination of the cured coating revealed a smooth surface containing some craters and spots of rust. Adhesion was satisfactory.

The description of the invention and examples have been provided to enable those skilled in the art to understand the invention and its preferred embodiments. Reasonable variation and modification are possible within the spirit and scope of the invention.

I claim:

1. A poly(arylene sulfide) coating composition which comprises
    (a) an arylene sulfide polymer,
    (b) an ammonium or alkali metal salt of an arylalkanoic acid, and
    (c) an aqueous medium.
2. A composition according to claim 1 in which the salt of an arylalkanoic acid is a compound having the formula $RCO_2M$, where R is selected from the group of unsubstituted and alkyl-substituted aralkyl radicals having 7–20 carbon atoms and M is a member of the group consisting of ammonium, lithium, sodium, potassium, rubidium, and cesium.
3. A composition according to claim 1 in which the poly(arylene sulfide) comprises 10–60 weight percent of the total composition and the salt of an arylalkanoic acid comprises 0.05–10 weight percent of the total composition.
4. A composition according to claim 2 in which the poly(arylene sulfide) comprises 20–40 weight percent of the total composition and the compound having the formula $RCO_2M$ comprises 0.2–3 weight percent of the total composition.
5. A composition according to claim 1 in which the poly(arylene sulfide) is a poly(phenylene sulfide).
6. A composition according to claim 2 in which M is ammonium.
7. A composition according to claim 4 in which the compound having the formula $RCO_2M$ is ammonium phenylacetate.
8. A composition according to claim 4 in which the compound having the formula $RCO_2M$ is ammonium phenylacetate and the poly(arylene sulfide) is a poly(phenylene sulfide).
9. An article coated with the composition of claim 1.
10. The article of claim 9 comprising an iron-containing substrate.
11. The article of claim 9 in which the coating composition comprises a normally solid poly(arylene sulfide), ammonium phenylacetate, and an aqueous medium.
12. A process for inhibiting the corrosion of metal during coating with poly(arylene sulfide) which comprises applying the coating composition of claim 1 to a metal substrate, removing the aqueous medium, and heating the remaining composition to cure the poly(arylene sulfide), thus forming a smooth coating of poly(arylene sulfide) on the substrate.
13. The process of claim 12 in which the metal substrate is an iron or iron-containing substrate.
14. The process of claim 12 in which the coating composition comprises a normally solid poly(phenylene sulfide), ammonium phenylacetate, and an aqueous medium.

* * * * *